US010724432B2

(12) United States Patent
Shapiro et al.

(10) Patent No.: US 10,724,432 B2
(45) Date of Patent: Jul. 28, 2020

(54) INTEGRATED FUEL CELL AND ENGINE COMBUSTOR ASSEMBLY

(71) Applicant: General Electric Company, Schenectady, NY (US)

(72) Inventors: Andrew Philip Shapiro, Schenectady, NY (US); Narendra Digamber Joshi, Guilderland, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 316 days.

(21) Appl. No.: 15/805,878

(22) Filed: Nov. 7, 2017

(65) Prior Publication Data
US 2019/0136761 A1    May 9, 2019

(51) Int. Cl.
*F02C 3/20* (2006.01)
*H01M 8/124* (2016.01)
(Continued)

(52) U.S. Cl.
CPC .................. *F02C 6/10* (2013.01); *F02C 3/20* (2013.01); *F02C 3/205* (2013.01); *F02C 6/06* (2013.01);
(Continued)

(58) Field of Classification Search
CPC .... F02C 6/10; F02C 3/205; F02C 6/06; F02C 3/20; F05D 2210/40; F05D 2220/70; F05D 2220/323; H01M 8/00; H01M 8/04201; H01M 8/1246; H01M 8/04111; H01M 2008/1293; H01M 2004/8694;
(Continued)

(56) References Cited

U.S. PATENT DOCUMENTS

| 5,323,604 A | 6/1994 | Ekstedt et al. |
| 6,213,234 B1 * | 4/2001 | Rosen ................... B60L 50/15 180/65.245 |

(Continued)

OTHER PUBLICATIONS

Pratt et al., "Development of an Engine-Integrated Fuel Cell Concept Demonstrator: Initial System Sizing", 52nd AIAA/SAE/ASEE Joint Propulsion Conference, AIAA Propulsion and Energy Forum, Jul. 25-27, 2016, Salt Lake City, Utah.

(Continued)

*Primary Examiner* — William H Rodriguez
(74) *Attorney, Agent, or Firm* — Christopher R. Carroll; The Small Patent Law Group, LLC (57) ABSTRACT

An integrated fuel cell and engine combustor assembly includes an engine combustor having a combustion chamber fluidly coupled with a compressor and a turbine. The assembly also includes a fuel cell stack circumferentially extending around the combustion chamber of the combustor. The fuel cell stack includes fuel cells configured to generate electric current. The fuel cell stack is positioned to receive discharged air from the compressor and fuel from a fuel manifold. The fuel cells in the fuel cell stack generate electric current using the discharged air and at least some of the fuel. The fuel cell stack is positioned to radially direct partially oxidized fuel from the fuel cells into the combustion chamber of the combustor. The combustor combusts the partially oxidized fuel into one or more gaseous combustion products that are directed into and drive the downstream turbine.

16 Claims, 6 Drawing Sheets

(51) Int. Cl.
*F02C 6/10* (2006.01)
*H01M 8/04111* (2016.01)
*H01M 8/1246* (2016.01)
*H01M 8/04082* (2016.01)
*F02C 6/06* (2006.01)
*H01M 4/86* (2006.01)

(52) U.S. Cl.
CPC .... *H01M 8/04111* (2013.01); *H01M 8/04201* (2013.01); *H01M 8/1246* (2013.01); *F05D 2210/40* (2013.01); *F05D 2220/323* (2013.01); *F05D 2220/70* (2013.01); *H01M 2004/8694* (2013.01); *H01M 2008/1293* (2013.01); *H01M 2250/10* (2013.01)

(58) Field of Classification Search
CPC ......... H01M 2250/10; H01M 2250/20; H01M 2250/40; B64D 2027/026; B64D 2041/005; Y02T 50/64; Y02T 90/32; Y02T 90/36
See application file for complete search history.

(56) References Cited

U.S. PATENT DOCUMENTS

| | | | |
|---|---|---|---|
| 6,854,688 B2 | 2/2005 | McElroy et al. | |
| 7,166,380 B2 | 1/2007 | Tsunoda | |
| 7,410,713 B2 | 8/2008 | Balan et al. | |
| 7,507,489 B2* | 3/2009 | Toriyama | H01M 8/04007 429/425 |
| 7,966,830 B2 | 6/2011 | Daggett et al. | |
| 9,118,054 B2 | 8/2015 | Gummalla et al. | |
| 9,541,001 B2* | 1/2017 | Steinwandel | H01M 8/04022 |
| 9,590,260 B2 | 3/2017 | Fernandes et al. | |
| 9,666,888 B2 | 5/2017 | Nagai et al. | |
| 2003/0205641 A1 | 11/2003 | McElroy et al. | |
| 2004/0028986 A1* | 2/2004 | Tsunoda | H01M 8/0247 429/456 |
| 2004/0043270 A1* | 3/2004 | Tsunoda | H01M 8/0247 429/454 |
| 2004/0053108 A1* | 3/2004 | Tsunoda | H01M 8/0247 429/505 |
| 2004/0062973 A1 | 5/2004 | Agnew et al. | |
| 2004/0234837 A1* | 11/2004 | Dan | H01M 8/0662 429/433 |
| 2004/0247987 A1* | 12/2004 | Izumi | H01M 4/8605 429/483 |
| 2006/0019134 A1 | 1/2006 | Yagi et al. | |
| 2006/0134485 A1* | 6/2006 | Horiuchi | F23D 14/10 429/441 |
| 2006/0228598 A1 | 10/2006 | Venkataraman et al. | |
| 2006/0280979 A1* | 12/2006 | Tsunoda | F01D 15/10 429/434 |
| 2007/0158500 A1 | 7/2007 | Sridhar et al. | |
| 2007/0243441 A1* | 10/2007 | Tsunoda | H01M 8/0202 429/444 |
| 2008/0001038 A1 | 1/2008 | Daggett | |
| 2009/0061270 A1* | 3/2009 | Tsunoda | H01M 8/04007 429/411 |
| 2009/0286134 A1* | 11/2009 | Kim | H01M 8/0206 429/423 |
| 2011/0223498 A1* | 9/2011 | Konrad | H01M 8/04111 429/414 |
| 2011/0305960 A1* | 12/2011 | Song | H01M 8/0258 429/413 |
| 2012/0009381 A1* | 1/2012 | Zhang | B82Y 30/00 428/118 |
| 2012/0121995 A1* | 5/2012 | Grieve | H01M 8/0618 429/410 |
| 2012/0251899 A1 | 10/2012 | Lehar et al. | |
| 2013/0078541 A1 | 3/2013 | Gummalla et al. | |
| 2013/0239581 A1 | 9/2013 | Johnson et al. | |
| 2013/0316255 A1 | 11/2013 | Bozzolo et al. | |
| 2014/0047814 A1* | 2/2014 | Steinwandel | H01M 8/04022 60/39.12 |
| 2014/0057184 A1* | 2/2014 | Pillai | H01M 8/0662 429/410 |
| 2014/0120437 A1 | 5/2014 | Fernandes et al. | |
| 2014/0144149 A1 | 5/2014 | Leinonen et al. | |
| 2014/0216036 A1 | 8/2014 | Bozzolo et al. | |
| 2014/0242483 A1 | 8/2014 | Bozzolo et al. | |
| 2015/0030947 A1 | 1/2015 | Saunders et al. | |
| 2015/0211742 A1 | 7/2015 | Lee | |
| 2015/0345386 A1* | 12/2015 | Nakamoto | F02C 3/20 60/801 |
| 2015/0353201 A1* | 12/2015 | Hagh | A62C 3/065 244/135 R |
| 2016/0133955 A1 | 5/2016 | Ozawa | |
| 2016/0190622 A1 | 6/2016 | Whyatt et al. | |
| 2017/0288246 A1* | 10/2017 | Mizuno | H01M 8/04014 |

OTHER PUBLICATIONS

Ananda et al., "Hybrid Solid Oxide Fuel Cell/Gas Turbine System for High Altitude Long Endurance Aerospace Missions", International Conference on Fuel Cell Science, http://proceedings.asmedigitalcollection.asme.org/proceeding.aspx?articleid=1592865, pp. 573-584. 2006. (18 pages).

Harvey et al., "Gas Turbine Cycles With Solid Oxide Fuel Cells—Part I: Improved Gas Turbine Power Plant Efficiency by Use of Recycled Exhaust Gases and Fuel Cell Technology", Journal of Energy Resources Technology. http://energyresources.asmedigitalcollection.asme.org/article.aspx?articleid=1413401, vol. 116, Issue 04, pp. 305-311, Dec. 1, 1994. (7 pages).

Rajashekara et al., "Solid Oxide Fuel Cell/Gas Turbine Hybrid APU System for Aerospace Applications", Industry Applications Conference, http://ieeexplore.ieee.org/abstract/document/4025534/, Oct. 8-12, 2006. (8 pages).

Swopes. "Tag Archives: General Electric CJ805-3B", This Day in Aviation, https://www.thisdayinaviation.com/tag/general-electric-cj805-3b/, Feb. 10, 2017, 5 pages.

\* cited by examiner

INTEGRATED FUEL CELL AND ENGINE COMBUSTOR ASSEMBLY

FIELD

The present subject matter relates generally to power-generating systems, such as fuel cells and gas turbine engines.

BACKGROUND

Fuel efficiency of engines can be an important consideration selection and operation of the engines. For example, fuel efficiency of gas turbine engines in aircraft can be an important (and limiting) factor on how far the aircraft can travel. Some aircraft propulsion systems can include fuel cells in addition to the gas turbine engines. These fuel cells are located upstream of combustors and downstream from compressors of the gas turbine engines. Compressed air that is output by the compressors flows along the length of the engine and into the fuel cells. Part of this air is consumed by the fuel cells in generating electric energy. The rest of the air can flow through or around the fuel cells and into a combustor. This air is then mixed with fuel and combusted in a combustor of the engine.

One problem with known fuel cell-combustor combinations is the requirement of conduits to direct the flow of air into the fuel cells and out of the fuel cells into the combustor. These conduits can increase the size of the fuel cell and engine combination, as well as require heating elements to ensure that the air is sufficiently hot for consumption within the fuel cells.

SUMMARY

In one embodiment, an integrated fuel cell and engine combustor assembly is provided. The assembly includes an annular engine combustor extending along an annular axis. The combustor has an interior combustion chamber that is configured to be fluidly coupled with an upstream compressor and a downstream turbine. The assembly also includes a fuel cell stack circumferentially extending around the combustion chamber of the combustor. The fuel cell stack includes plural fuel cells configured to generate electric current. The fuel cell stack is positioned to receive discharged air from the compressor and fuel from a fuel manifold. The fuel cells in the fuel cell stack are configured to generate the electric current using the discharged air and at least some of the fuel. The fuel cell stack is positioned to radially direct partially oxidized fuel from the fuel cells into the combustion chamber of the combustor. The combustor is configured to combust the partially oxidized fuel into one or more gaseous combustion products that are directed into and drive the downstream turbine.

In one embodiment, an engine assembly includes an engine combustor having a combustion chamber with an outer diameter that extends along an annular axis, and a fuel cell stack extending around the outer diameter of the combustion chamber and around the annular axis such that the outer diameter of the combustion chamber is between the annular axis and the fuel cell stack along radial directions outwardly extending from the annular axis. The fuel cell stack is positioned to receive discharged air from a compressor and fuel. The fuel cell stack is configured to generate electric current using the discharged air and the fuel. The fuel cell stack is positioned to radially direct partially oxidized fuel passing through the fuel cell stack into the combustion chamber of the combustor. The combustor is configured to combust the partially oxidized fuel into one or more gaseous combustion products that drive a downstream turbine.

In one embodiment, a method includes compressing inlet air using a compressor of a turbine engine, directing the inlet air that is compressed by the compressor into a fuel cell stack disposed radially outward of a combustion chamber of a combustor that extends along an annular axis in the turbine engine, directing fuel into the fuel cell stack, converting at least some of the inlet air that is compressed and the fuel into electric current using the fuel cell stack, radially directing partially oxidized fuel from the fuel cell stack into the combustion chamber of the combustor toward the annular axis, combusting the partially oxidized fuel into one or more gaseous combustion products in the combustion chamber of the combustor, and driving a turbine of the turbine engine using the one or more gaseous combustion products.

These and other features, aspects and advantages of the present inventive subject matter will become better understood with reference to the following description and appended claims. The accompanying drawings, which are incorporated in and constitute a part of this specification, illustrate embodiments of the inventive subject matter and, together with the description, serve to explain the principles of the inventive subject matter.

BRIEF DESCRIPTION OF THE DRAWINGS

A full and enabling disclosure of the inventive subject matter, including the best mode thereof, directed to one of ordinary skill in the art, is set forth in the specification, which makes reference to the appended figures, in which.

DETAILED DESCRIPTION

Reference will now be made in detail to present embodiments of the inventive subject matter, one or more examples of which are illustrated in the accompanying drawings. The detailed description uses numerical and letter designations to refer to features in the drawings. Like or similar designations in the drawings and description have been used to refer to like or similar parts of the inventive subject matter. As used herein, the terms "first," "second," and "third" may be used interchangeably to distinguish one component from another and are not intended to signify location or importance of the individual components.

One or more embodiments of the inventive subject matter described herein provide fuel cell and combustor assemblies for engine systems, such as gas turbine engines of aircraft (or other vehicles or stationary power-generating systems). The assemblies (and accompanying methods described herein) integrate fuel cells (e.g., solid oxide fuel cells) and a combustor of an engine to provide electrical power and propulsion power in a thermally efficient manner. A fuel cell stack is arranged around the exterior of a combustor of the engine such that air flows radially inward through the fuel cells in the fuel cell stack, and into the combustor toward a center or annular axis of the combustor. The fuel cell stack can be integrated into the outer housing of the combustor such that no additional conduits or ducting is needed to fluidly couple the fuel cell stack with the combustor.

For example, the fuel cell stack can surround the outer diameter of the annular combustor with the plane of the fuel cells in the stack being oriented normal to the axis of the annulus in the combustor. The fuel cells form part of an arc around the combustor (e.g., radially outward from the annular axis of the combustor) so that many fuel cells can surround the combustor. The fuel cells can be stacked parallel to the annular axis of the annulus in the combustor, and the stacks of fuel cells are sealed so that compressor discharge air radially flows inward through the cathode flow fields of the fuel cells, exits into the annular combustor.

Optionally, the fuel cell stack may be positioned inside the annular combustor. For example, while the embodiments of the fuel cell and combustor assemblies described and shown herein include the fuel cell stack located around an outer diameter of the annular combustor (e.g., as an outer liner of the combustor), not all embodiments of the inventive subject matter require the fuel cell stack to be located as the outer liner of the combustor. The fuel cell stack can be located at the inner liner of the combustor, or multiple fuel stacks can be provided at the inner and outer liner portions of the combustor.

The fuel can be internally manifolded to the fuel cell stacks so that fuel is distributed evenly to the anode flow fields of the fuel cells. For example, fuel manifolds can extend through the fuel cells in directions that are parallel to the annular axis of the combustor. These manifolds can evenly distribute fuel to the fuel cells around the outer perimeter of the combustor (e.g., in the fuel cell stacks). Anode flow fields through which air and fuel flow between an electrolyte and an anode in each fuel cell are designed to evenly distribute the fuel throughout the fuel cell while managing the thermal distribution in the fuel cell. There may be regions in fuel cells in which the fuel flows radially inward, outward, circumferentially, or some combination.

A portion of the fuel is oxidized in the fuel cell stack to create electricity, and the unoxidized fuel and unused air is delivered to the combustor of the engine. For example, the hot compressed air from the compressor is supplied to a cathode manifold of the fuel cell stack, and partially reformed fuel is supplied to an anode manifold of the fuel cell stack. A portion of the fuel is oxidized electrochemically, providing electricity that can be used in the operation of an aircraft including for generating thrust by driving a fan or propeller. The anode gas can leave the fuel cells by flowing radially inward toward the combustor. The partially oxidized fuel and air exhaust flow directly to the engine combustor, where supplemental fuel and air may be added and burned. The high-pressure combustor exhaust flows to the engine turbine where the exhaust generates power to drive the compressor, and possibly an electrical generator, before the exhaust gases exit the engine at high speed and generate thrust.

The fuel cell and combustor assemblies described herein can be used to generate electric power for creation of thrust in addition to that provided by the engine exhaust. For example, the draw of electrical current from the fuel cell stack in a gas turbine engine can be used to power one or more motors that add torque to a fan of the gas turbine engine. This increases overall fuel efficiency of a propulsion system that includes the fuel cells and combustors. For example, there is potential for a 10% or more reduction in fuel burn to complete a mission.

Figure 1:
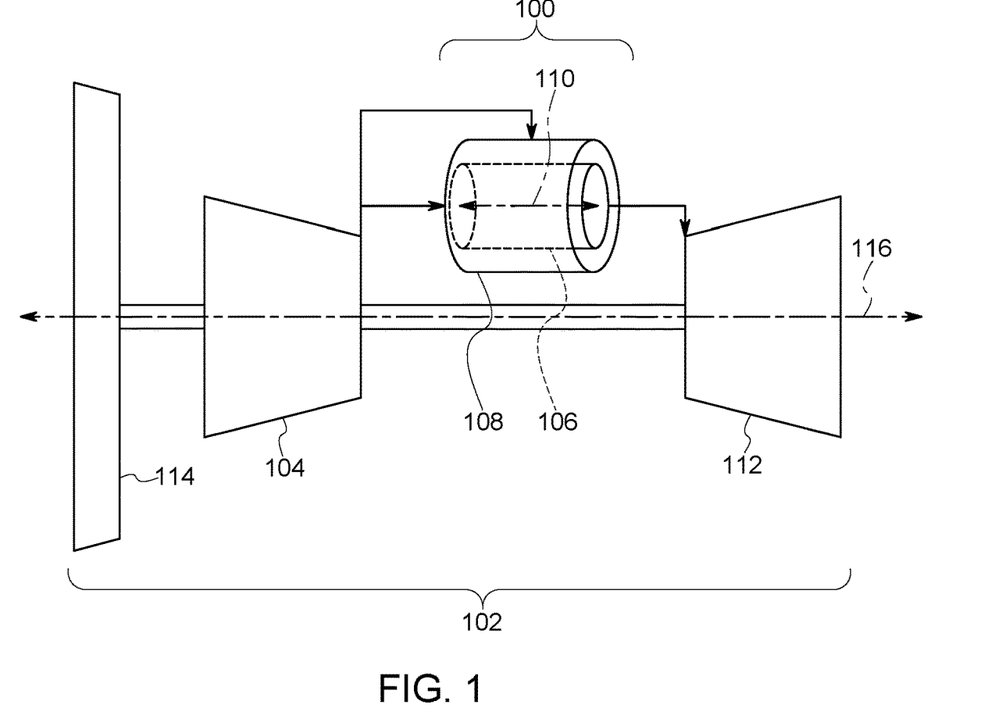
FIG. 1 schematically illustrates one embodiment of a fuel cell and combustor assembly used in a gas turbine engine system.

FIG. 1 schematically illustrates one embodiment of a fuel cell and combustor assembly 100 used in a gas turbine engine system 102. The engine system 102 includes one or more compressors 104 that receive inlet air and compress this air via one or more stages of rotating blades. The compressed air is directed into the fuel cell and combustor assembly 100.

The assembly 100 includes an annular combustor 106 that is circumferentially surrounded along some or all the length of the combustor 106 by a fuel cell stack 108. The fuel cell stack 108 includes multiple fuel cells arranged to convert fuel and compressed air from the compressor 104 into electric energy. The fuel cell stack 108 can be integrated into the outer portion of the combustor 106 such that the fuel cell stack 108 is part of the combustor 106 and is located radially outside of the combustor 106 (e.g., relative to an annular axis 110 of the combustor 106). The engine 102 includes a center axis 116 which may be coincident with the axis 110 or may not be coincident with the axis 110.

Some of the compressed air exiting the compressor 104 is directed through the fuel cells in the fuel cell stack 108 in radially inward directions toward the annular axis 110 of the combustor 106. Some or all the remaining amount of compressed air from the compressor 104 is directed into the combustor 106 in a direction or directions along or parallel to the annular axis 110 of the combustor 106.

The fuel cells in the fuel cell stack 108 receive fuel from fuel manifolds and air from the compressor 104, and convert this fuel and air into electric energy. Partially oxidized fuel and air exhaust from the fuel cells in the fuel cell stack 108 flow radially inward into the combustor 106 toward the annular axis 110. The partially consumed fuel and air exhaust from the fuel cells, additional air from the compressor 104, and/or additional fuel from one or more fuel injectors are combusted within the combustor 106. Exhaust from the combusted fuel and air mixture is then directed into a turbine 112, which converts the exhaust into rotating energy that can be used to power one or more loads 114, such as a fan used to propel a vehicle (e.g., an aircraft), a generator, or the like.

Figure 2:
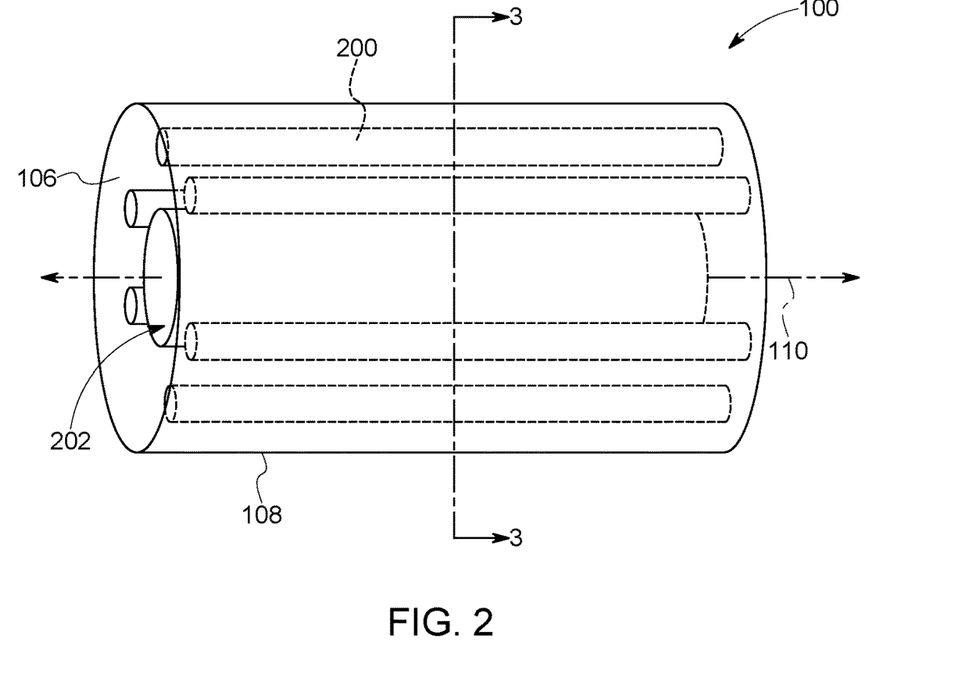
FIG. 2 schematically illustrates one embodiment of the fuel cell and combustor assembly shown in FIG. 1.

FIG. 2 schematically illustrates one embodiment of the fuel cell and combustor assembly 100 shown in FIG. 1. As described above, the assembly 100 includes the fuel cell stack 108 located radially outward of the combustor 106 relative to the annular axis 110 of the combustor 106. The fuel cell stack 108 includes several fuel manifolds 200 located at different along the perimeter of the combustor 106. The number and/or arrangement of the fuel manifolds 200 shown in FIG. 2 is one embodiment and is not limiting on all embodiments of the inventive subject matter described herein.

The fuel manifolds 200 are conduits that receive fuel for the fuel cells in the stack 108 and distribute the fuel to the cells. The fuel manifolds 200 can be fluidly coupled with a source of the fuel, such as one or more tanks or other containers of the fuel. The fuel manifolds 200 can include orifices that deliver the fuel to the fuel cells in locations that deliver fuel into fuel flow passages, as shown and described in connection with FIG. 5. In one embodiment, the fuel is not simply injected from the manifolds 200 through orifices into the air stream through the combustor 106. Instead, the fuel can be directed into flow passages described below in connection with FIG. 5. As shown in FIG. 2, the fuel manifolds 200 can be elongated conduits that are elongated along directions that are parallel to or otherwise along the annular axis 110 of the combustor 106. Alternatively, the fuel manifolds 200 can have another shape, such as rings that encircle the combustor 106.

In one embodiment, the fuel manifolds 200 can be individually controlled. For example, a controller (e.g., hardware circuitry that includes and/or is coupled with one or more processors, such as microprocessors) can control valves which, in turn, control the flow of fuel to different ones of the fuel manifolds 200. The amount of current that is drawn from the fuel cell stack 108 can be controlled (e.g., by the controller) during operation of an engine that includes the assembly 100. The controller can close or open valves to decrease or increase (respectively) the amount of fuel flowing into the fuel cell stack 108. The amount of fuel flowing into the fuel cell stack 108 can be decreased to decrease the electric current generated by the fuel cell stack 108, or can be increased to increase the current generated by the fuel cell stack 108. Optionally, no fuel can be delivered to the fuel cell stack 108 via the manifolds 200 to prevent the fuel cell stack 108 from generating any electric current.

The fuel cell stack 108 directly abuts the combustor 106 along the length of the combustor 106. The fuel cell stack 108 can form the outer surface or boundary of the combustor 106. This can include the fuel cell stack 108 being integrally formed with the combustor 106. This arrangement reduces or eliminates the need to additional ducting to fluidly couple the fuel cell stack 108 with the combustor 106.

The combustor 106 includes an interior combustion chamber 202 that is fluidly coupled with the compressor 104, the turbine 112, and the fuel cell stack 108. The chamber 202 receives unspent fuel and air from the fuel cell stack 108 along radially inward directions oriented toward the annular axis 110 of the combustor 106 and the combustion chamber 202. The chamber 202 also can receive supplemental fuel and air from the compressor 104. This supplemental fuel and air does not pass or flow through any fuel cells in the fuel cell stack 108, and can flow into the chamber 202 in directions along or parallel to the annular axis 110.

Figure 3:
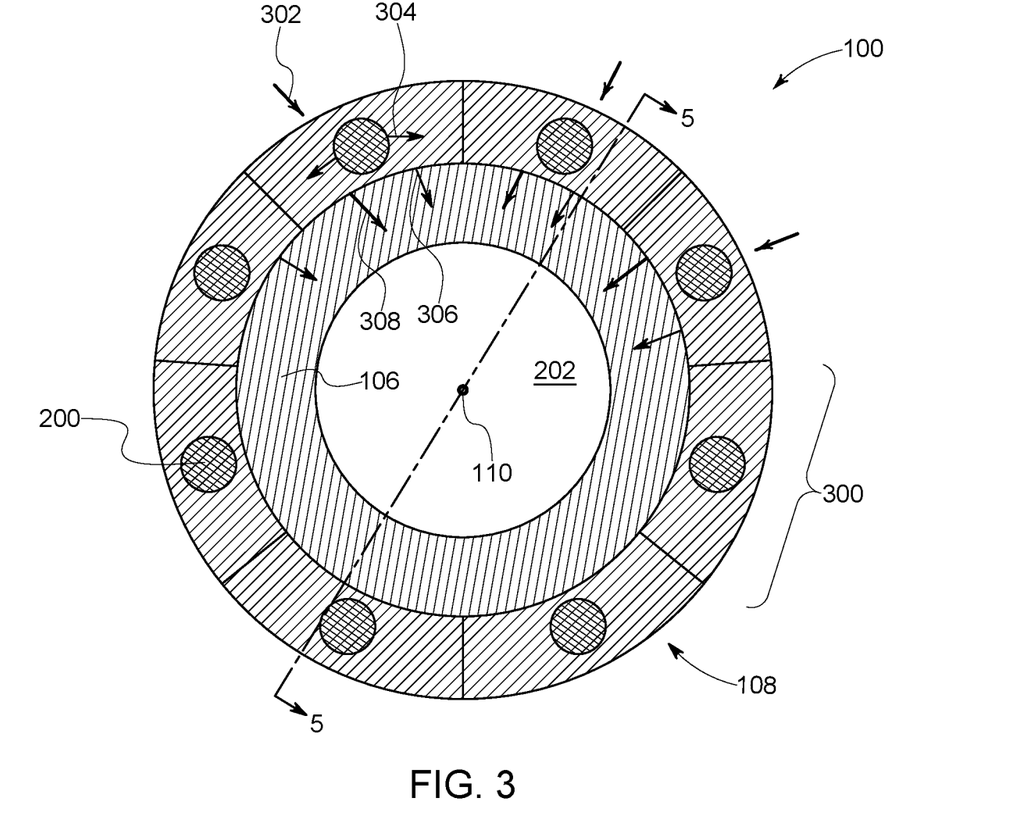
FIG. 3 illustrates a cross-sectional view of one embodiment of the integrated fuel cell and combustor assembly shown in FIG. 1 along line 3-3 in FIG. 2.

FIG. 3 illustrates a cross-sectional view of one embodiment of the integrated fuel cell and combustor assembly 100 along line 3-3 shown in FIG. 2. As shown, the fuel cell stack 108 circumferentially extends around the combustion chamber 202 of the combustor 106 by completely encircling the combustion chamber 202 around the annular axis 110. The fuel cell stack 108 includes several fuel cells 300 that generate electric current. These fuel cells 300 are solid oxide fuel cells in one embodiment. Alternatively, the fuel cells 300 can be another type of fuel cell. The fuel cells 300 are formed as parts or segments of an annulus that encircles the combustion chamber 202.

The fuel cells 300 that are visible in FIG. 3 may be a single ring of fuel cells 300, with many more fuel cells 300 axially stacked together to form the fuel cell stack 108. For example, multiple additional rings of fuel cells 300 may be placed on top of each other to form the fuel cell stack 108 that is elongated along the annular axis 110. While eight fuel cells 300 are shown in the ring in FIG. 3, more or fewer fuel cells 300 can form the ring that encircles the combustion chamber 202.

The fuel cells 300 in the stack 108 are positioned to receive discharged air 302 from the compressor 104 and fuel 304 from the fuel manifolds 200. The fuel cells 300 generate electric current using this air 302 and at least some of this fuel 304, and radially direct partially oxidized fuel 306 and unused air 308 into the combustion chamber 202 of the combustor 106 toward the annular axis 110. The combustor 106 combusts the partially oxidized fuel 306 and air 308 in the combustion chamber 202 into one or more gaseous combustion products (e.g., exhaust), that are directed into and drive the downstream turbine 112.

Figure 4:
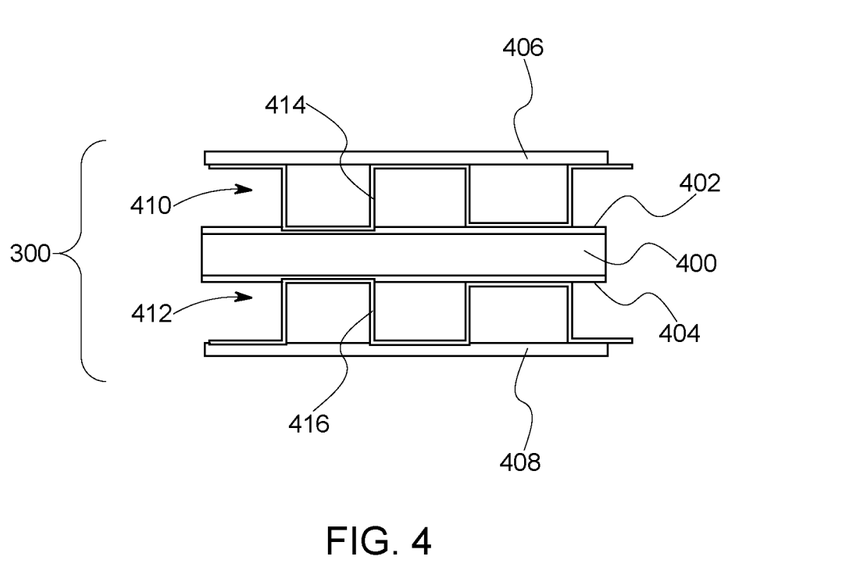
FIG. 4 illustrates one of the fuel cells shown in FIG. 3 in the fuel cell stack shown in FIG. 1 according to one embodiment.
Figure 5:
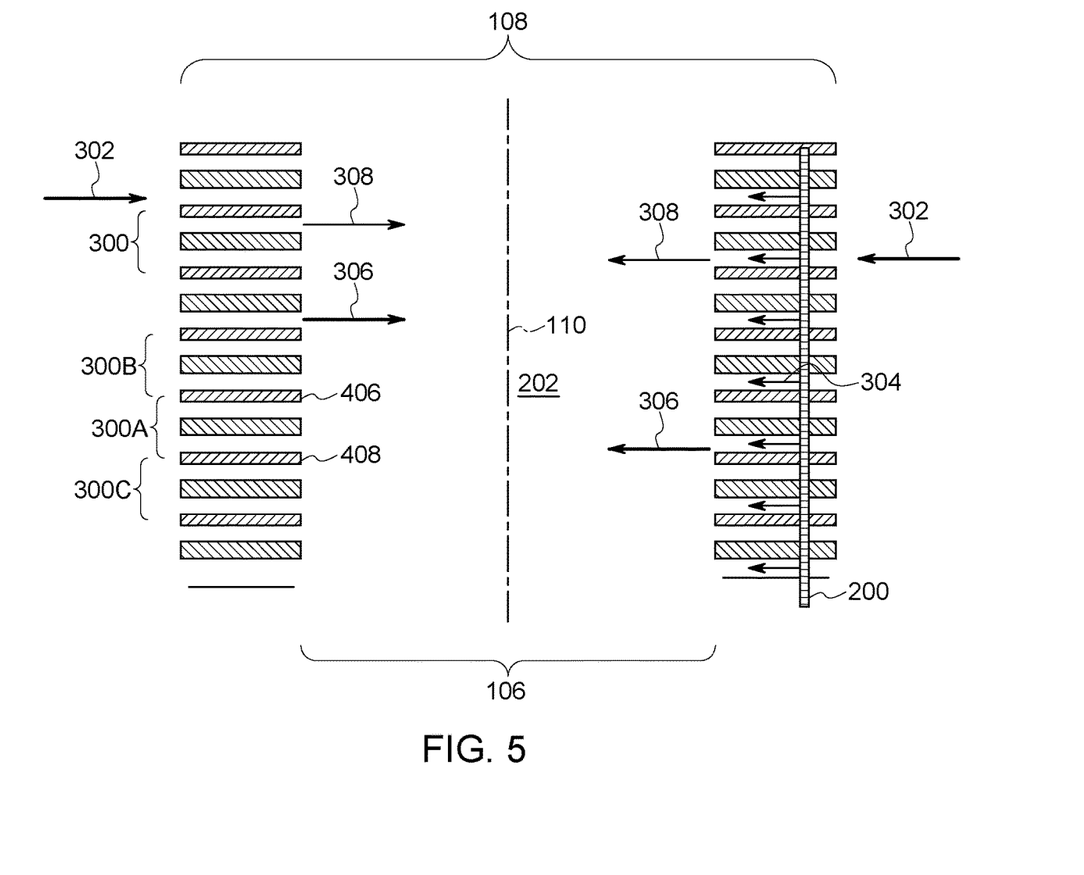
FIG. 5 illustrates a cross-sectional view of the fuel cell stack shown in FIG. 1 along line 5-5 in FIG. 3.

FIG. 4 illustrates one of the fuel cells 300 shown in FIG. 1 in the fuel cell stack 108 shown in FIG. 1 according to one embodiment. FIG. 5 illustrates a cross-sectional view of the fuel cell stack 108 along line 5-5 shown in FIG. 3. The fuel cell 300 in FIG. 4 is viewed in a radial direction or another direction that is perpendicular to the annular axis 110 shown in FIG. 1. The fuel cell 300 includes an electrolyte 400 that is located between a cathode 402 and an anode 404. The cathode 402 and the anode 404 may be formed as conductive surfaces on opposite sides of the electrolyte 400. In the illustrated embodiment, the cathode 402 directly contacts and abuts one side of the electrolyte 400 while the anode 404 directly contacts and abuts the opposite side of the electrolyte 400. Bipolar plates 406, 408 are disposed on opposite sides of the assembly formed of the electrolyte 400, anode 404, and cathode 402 such that a gap exists between the bipolar plate 406 and the cathode 402 and another gap exists between the bipolar plate 408 and the anode 404. The electrolyte 400, cathode 402, anode 404, and bipolar plates 406, 408 may be formed in the shapes of the fuel cells 300 shown in FIG. 3, such as plates having partial wedge shapes or shapes of parts of the annular ring formed by the fuel cells 300 shown in FIG. 3. The electrolyte 400 can be formed from a ceramic material, such as yttria-stabilized zirconia or another material. The cathode 402, anode 404, and bipolar plates 406, 408 can be formed from conductive materials.

The gap between the bipolar plate 406 and the cathode 402 extends along or in a direction that is parallel to the annular axis 110. This gap can be referred to as a cathode flow field 410. The anode 404 and the bipolar plate 408 are spaced apart from each other by another gap along or parallel to the annular axis 110. This other gap can be referred to as an anode flow field 412. Optionally, another electrolyte 400 can be included in the fuel cell 300 on the bipolar plate 408. This additional electrolyte 400 can directly abut the bipolar plate 408 and be located opposite of the anode 404 across the anode flow field 412.

In one embodiment, air (and not fuel) flows through one of the fields 410 or 412, while fuel (and not air) flows through the other of the fields 412 or 410. As described above in connection with FIG. 2, the fuel manifolds 200 can include orifices or other openings that are positioned to deliver the fuel into the fields 410 or 412, but that are not positioned to deliver the fuel into the other fields 412 or 410.

The size of the flow fields 410, 412 can be relatively small or narrow. For example, the combustor 106 may have a pressure drop (e.g., two to five percent) across the liner or across the fuel cell stack 106. This pressure drop helps force the flow of both air and fuel through the flow fields 410, 412. Therefore, the flow fields 410, 412 can be narrow, thereby allowing the fuel cells 300 to be packed at significantly large densities that generate large power per unit volume.

Air can flow in radial directions toward the annular axis 110 from locations outside of the fuel cell 300 and outside of the fuel cell stack 108, through the cathode flow field 410 and/or the anode flow field 412, and out of the fuel cell 300 into the combustion chamber 202 (shown in FIG. 2) of the combustor 106. Fuel can flow from the fuel manifold 200 and radially through the cathode flow field 410 and/or the anode flow field 412, and out of the fuel cell 300 toward the annular axis 110 into the combustion chamber 202. At least some of the air and fuel are consumed by the fuel cell 300 to generate electric energy.

In the illustrated embodiment, the fuel cell 300 can include conductive connections or contacts 414, 416 between the cathode 402 and the bipolar plate 406 and between the anode 404 and the bipolar plate 408. The contacts 414 can conductively couple the cathode 402 with the bipolar plate 406 and the contacts 416 can conductively couple the anode 404 with the bipolar plate 408. The contacts 414, 416 can be formed from one or more conductive materials, such as corrugated sheet metal, that contacts the cathode 402 and anode 404 to the corresponding adjacent or neighboring bipolar plates 406, 408. Stacking the individual cells 300 to each other adds the voltages generated by the cells 300. Depending on the number of stacked cells 300 in the fuel cell stack 108, the fuel cell stack 108 could generate hundreds of volts of current when operating.

The bipolar plates 406, 408 can be shared between adjacent or neighboring fuel cells 300, as shown in FIG. 5. For example, the fuel cell labeled 300A in FIG. 5 may share the bipolar plate 406 with the fuel cell labeled 300B in FIG. 5 (with the other bipolar plate of the fuel cell 300B being the bipolar plate 408). The fuel cell 300A may share the bipolar plate 408 with the fuel cell labeled 300C in FIG. 5 (with the other bipolar plate of the fuel cell 300C being the bipolar plate 406). This results in the fuel cells 300 being arranged in an alternating sequence where a first fuel cell 300 has a cathode 402 facing a first direction along or parallel to the annular axis 110 and an anode 404 facing an opposite, second direction along or parallel to the annular axis 110. The next (second) fuel cell 300 along the annular axis 110 has a cathode 402 facing the second direction and an anode 404 facing the first direction. The next (third) fuel cell 300 along the annular axis 110 has a cathode 402 facing the first direction and an anode 404 facing the second direction, and so on.

In operation, compressed air 302 is received from the compressor 104. The air 302 flows into the fuel cells 300 in the fuel cell stack 108 in radially inward directions toward the annular axis 110, as shown in FIG. 5. This air 302 is not received by any fuel cell 300 in directions that are along or parallel to the annular axis 110 in one embodiment. Fuel 304 is dispersed inside the fuel cells 300 by the fuel manifolds 200. Although the fuel manifold 200 is shown only extending through or along the fuel cells 300 on the right side of FIG. 5, the fuel cells 300 on the left side also may be fed fuel 304 from another fuel manifold 200.

Not all of the fuel flowing through the fuel cell stack 108 may be consumed by the fuel cells 300. For example, anywhere from two to fifty percent of the fuel flowing into the fuel cell stack 108 may be consumed by the fuel cells 300. The remaining fuel may flow out of the fuel cell stack 108 and into the combustor 106. This fuel can be consumed within the combustor 106.

Some of the incoming air 302 and some of the fuel 304 are consumed by the fuel cells 300 to generate electric current. This current can be conducted out of the fuel cells 300 and the fuel cell stack 108 via one or more conductive pathways (e.g., wires, buses, cables, etc.) to a load (e.g., a motor that rotates the fan as the load 114) and/or to a storage device (e.g., one or more batteries). Effluent from the fuel cells 300 can include depleted air 308, unburned (or unconsumed) fuel 306, and/or one or more other gases, such as H2O+CO2. The depleted air 308, unburned fuel 306, and/or other gases radially flow out of the fuel cells 300 toward the annular axis 110 into the combustion chamber 202 of the combustor 106. The air 308, fuel 306, and/or other gases may combust in the combustion chamber 202 to generate exhaust that is delivered to the turbine 112 (shown in FIG. 1), as described above. For example, consumption of fuel in the fuel cell stack 108 can result in vitiation of the air and fuel streaming through the fuel cell stack 108. This can result in reduced NOx emissions when combusted in the combustion chamber 202.

Figure 6:
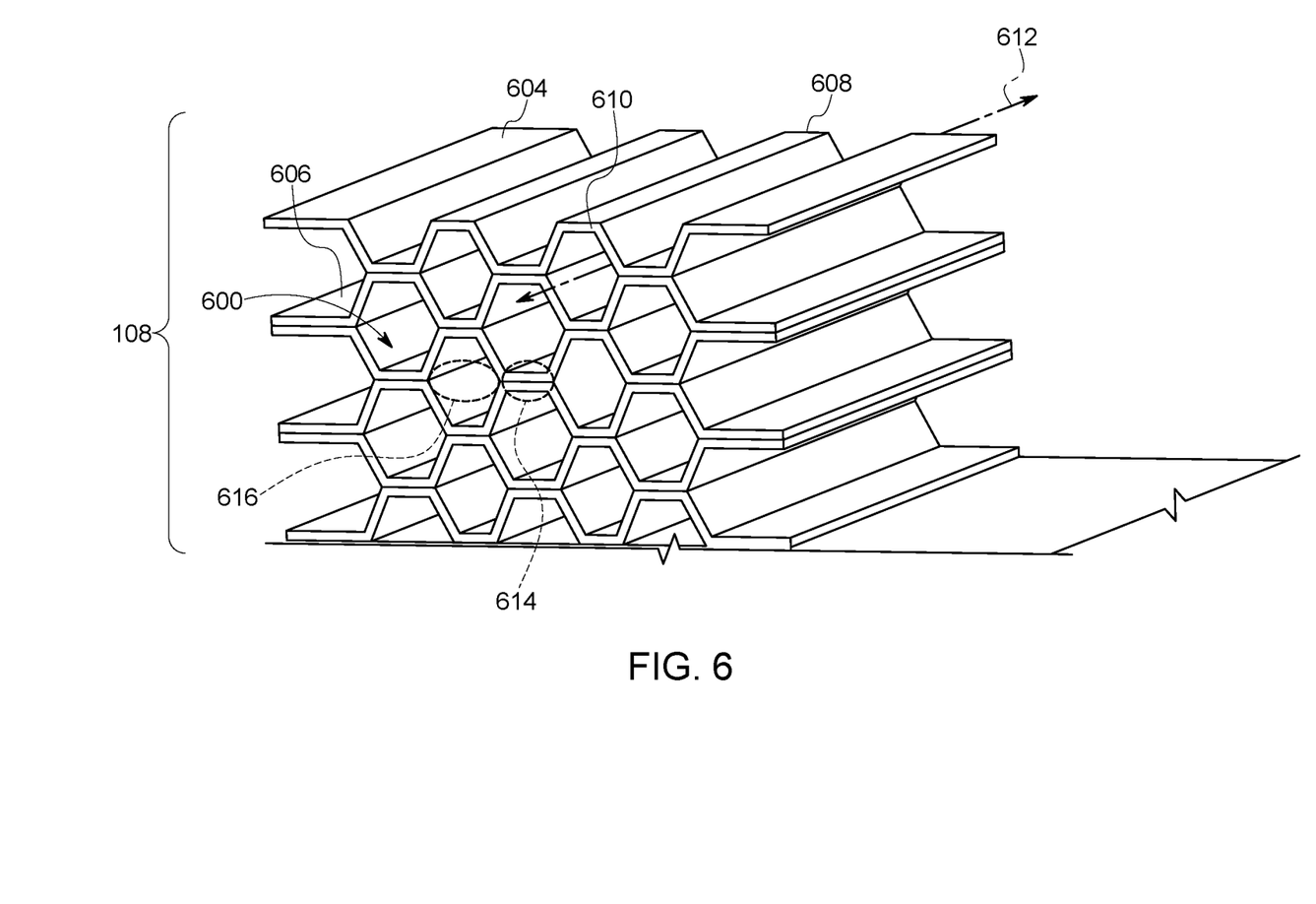
FIG. 6 illustrates another embodiment of the fuel cell stack shown in FIG. 1.
Figure 7:
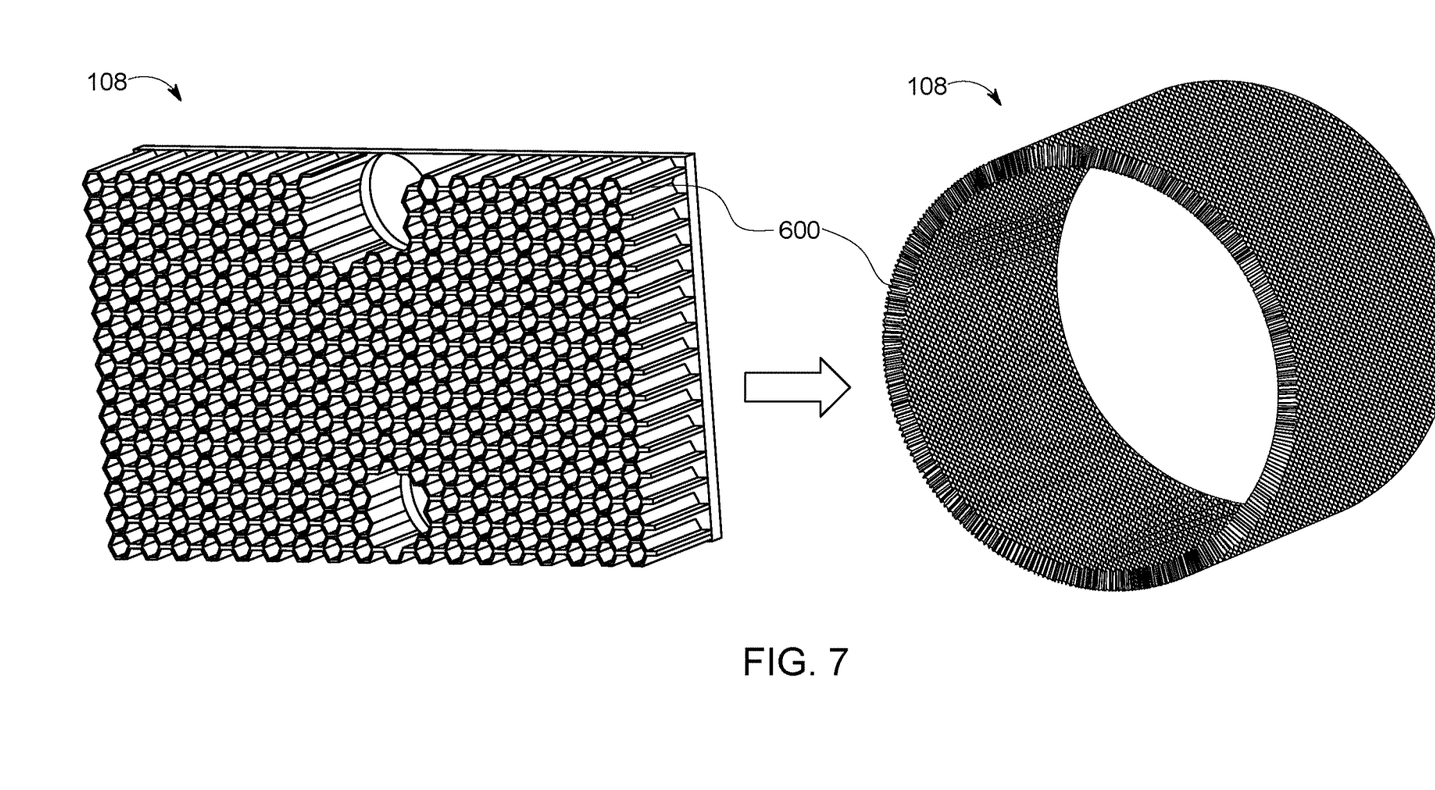
FIG. 7 illustrates the planar fuel cell stack shown in FIG. 6 being bent into an annular shape.

FIGS. 6 and 7 illustrate another embodiment of the fuel cell stack 108 shown in FIG. 1. The fuel cell stack 108 can be formed from fuel cell tubes 600 that are elongated conduits. The tubes 600 can be elongated in directions that are radially oriented (or perpendicular) to the annular axis 110 (shown in FIG. 1) of the combustor 106. For example, the tubes 600 can extend from an interior end 608 to an outer end 610, with the interior end 608 facing and/or extending to the combustion chamber 202 (shown in FIG. 2) of the combustor 106 (shown in FIG. 1), the outer end 610 facing an opposite direction (e.g., radially outward from the annular axis 110, and center axes 612 of the tubes 600 being oriented along radial directions from the annular axis 110.

The tubes 600 are formed by undulating anode plates 604 and undulating cathode plates 606. The undulating anode plates 604 and the undulating cathode plates 606 contact each other in first locations 614 and are spaced apart from each other in different, second locations 616. The second locations 616 are separated from each other by the first locations 614 such that placing the first locations 614 of the plates 604, 606 against each other creates separation between the plates 604, 606 and forms the conduits of the tubes 600.

Different tubes 600 may carry different components used by the fuel cell stack 108 to generate electric current. For example, some tubes 600 may carry fuel 304 (shown in FIG. 3) that is delivered from the fuel manifolds 200. The fuel manifolds 200 may be located outside of the outer ends 610 of the tubes 600. This can allow for fuel 304 delivered by the fuel manifolds 200 to be received into the tubes 600 through the open outer ends 610 of the tubes 600. Other tubes 600 may carry air 302 (shown in FIG. 3) that is delivered from the compressor 104. The air 302 may flow into the outer ends 610 of the tubes 600 toward the annular axis 110 of the combustor 106 along radial directions. The tubes 600 forming the fuel cell stack 108 can consume at least some of this air 302 and fuel 304 to generate electric current, as described above. The remaining components of the air 308 and fuel 306 can be delivered into the combustion chamber 202 and consumed, also as described above. The tubes 600 can be conductively coupled with each other in one or more series in order to add the current generated by each fuel cell. This can result in a significant amount of current (e.g., on the order of hundreds of volts) to be created by the fuel cell stack 108.

In one embodiment, the number of tubes 600 that are dedicated to carrying fuel and the number of tubes 600 dedicated to carrying air can be based on a relationship of the relative amounts of fuel and air consumed by the fuel cell stack 108. For example, if the fuel flow rate to the fuel cell stack 108 is to be between 2% and 5% of the air flow rate to the fuel cell stack 108, then each tube 600 carrying fuel can be surrounded by six tubes 600 carrying air to keep the fuel and air flow rates within a relationship that provides the fuel flow rate between 2% and 5% of the air flow rate. Optionally, another ratio of the tubes 600 may be divided among the tubes 600 carrying fuel and the tubes 600 carrying air.

FIG. 7 illustrates the planar fuel cell stack 108 shown in FIG. 6 being bent into an annular shape. The shape of the annular fuel cell stack 108 allows for the honeycomb-shaped fuel cell stack 108 with the adjacent tubes 600 to be placed outside of the combustor 106 shown in FIG. 1. The tubes 600 are elongated in directions that radially extend outward from the annular axis 110 of the combustor 106. This results in air flowing through the appropriate tubes 600 of the fuel cell stack 108 and into the combustor 106 in a radially inward direction toward the axis 110.

Figure 8:
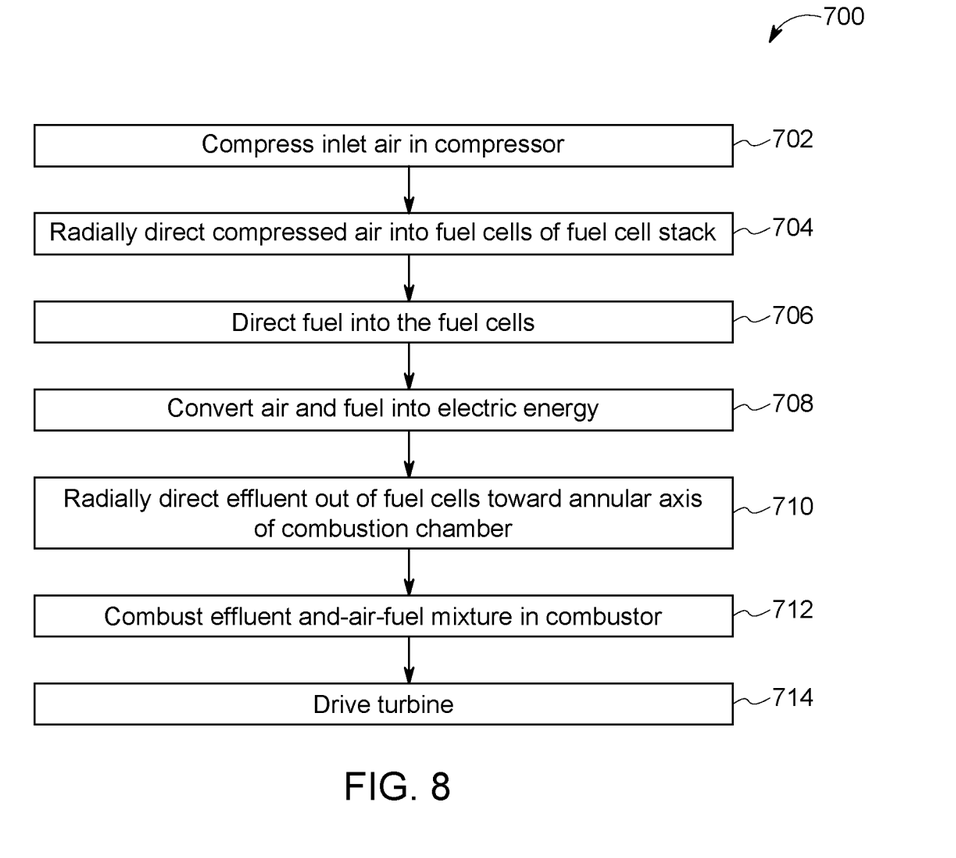
FIG. 8 illustrates a flowchart of one embodiment of a method for operating an integrated fuel cell and combustor assembly.

FIG. 8 illustrates a flowchart of one embodiment of a method 700 for operating an integrated fuel cell and combustor assembly. The method 700 can describe the operations performed in generating thrust and electric current using the fuel cell and combustor assemblies 100 (shown in FIG. 1) described herein. At 702, air that is inlet into a compressor of an engine is compressed. At 704, the compressed air is output from the compressor into a fuel cell stack of the fuel cell and combustor assembly. This air is directed into the fuel cells of the fuel cell stack in radially inward directions oriented toward an annular axis of the combustor that is inside the fuel cell stack. At 706, fuel is directed into the fuel cells. One or more fuel manifolds can dispense fuel among the fuel cells. The direction of fuel into the fuel cells (at 706) and the flow of air radially inward through the fuel cells (at 704) can occur simultaneously, concurrently, sequentially, or in a reverse order than shown in FIG. 8.

At 708, the air and fuel in the fuel cells are at least partially converted into electric energy. For example, the fuel cells can be connected in a series to build up a direct current that is created in the fuel cells. This current can be stored and/or used to power a load, such as a fan of the engine or another load. At 710, effluent of the fuel cells is radially directed inward into the combustion chamber of the combustor and toward the annular axis of the combustor. The effluent can include spent air, unburned fuel, and/or other gaseous constituents of the fuel cells. At 712, the effluent is combusted (at least partially) in the combustion chamber of the combustor. Additional air from the compressor and/or fuel from fuel injectors can be directed into the combustion chamber to aid with the combustion. The combustion in the combustion chamber generates gaseous combustion products. At 714, a turbine of the engine is driven by the gaseous combustion products in the combustor. For example, exhaust from the combustor may be directed into the turbine to rotate the turbine.

In one embodiment, an integrated fuel cell and engine combustor assembly is provided. The assembly includes an annular engine combustor extending along an annular axis. The combustor has an interior combustion chamber that is configured to be fluidly coupled with an upstream compressor and a downstream turbine. The assembly also includes a fuel cell stack circumferentially extending around the combustion chamber of the combustor. The fuel cell stack includes plural fuel cells configured to generate electric current. The fuel cell stack is positioned to receive discharged air from the compressor and fuel from a fuel manifold. The fuel cells in the fuel cell stack are configured to generate the electric current using the discharged air and at least some of the fuel. The fuel cell stack is positioned to radially direct partially oxidized fuel from the fuel cells into the combustion chamber of the combustor. The combustor is configured to combust the partially oxidized fuel into one or more gaseous combustion products that are directed into and drive the downstream turbine.

Optionally, each of the fuel cells in the fuel cell stack include an electrolyte spaced apart from a cathode and an anode of the fuel cell. The discharged air from the compressor can be drawn into and flows through the fuel cells between the cathode and the electrolyte and between the electrolyte and the anode in each fuel cell.

Optionally, the fuel cell stack circumferentially surrounds the combustion chamber of the combustor around the annular axis.

Optionally, the fuel cell stack is positioned radially outward of the combustion chamber of the combustor such that the combustion chamber is disposed between the annular axis and the fuel cell stack.

Optionally, the fuel cell stack is a solid oxide fuel cell stack.

Optionally, the fuel cells in the fuel cell stack are stacked next to each other in a direction that is parallel to the annular axis.

Optionally, the fuel cells in the fuel cell stack form concentric rings that encircle the annular axis.

Optionally, each of the fuel cells includes a cathode, an anode, and an electrolyte between the cathode and the anode in a direction that is parallel to the annular axis.

Optionally, the cathode is spaced apart from the electrolyte in a direction that is parallel to the annular axis by a cathode flow field through which the discharged air from the compressor radially flows toward the annular axis.

Optionally, the electrolyte is spaced apart from the anode in the direction that is parallel to the annular axis by an anode flow field through which the discharged air from the compressor radially flows toward the annular axis.

Optionally, the fuel cells in the fuel cell stack are elongated tubes that are elongated in radial directions that are perpendicular to the annular axis.

Optionally, the fuel cells in the fuel cell stack are formed by undulating anode plates and undulating cathode plates.

Optionally, the undulating anode plates and the undulating cathode plates contact each other in first locations and are spaced apart from each other in different, second locations. Separation between the anode plates and the cathode plates in the second locations can form the tubes of the fuel cells.

In one embodiment, an engine assembly includes an engine combustor having a combustion chamber with an outer diameter that extends along an annular axis, and a fuel cell stack extending around the outer diameter of the combustion chamber and around the annular axis such that the outer diameter of the combustion chamber is between the annular axis and the fuel cell stack along radial directions outwardly extending from the annular axis. The fuel cell stack is positioned to receive discharged air from a compressor and fuel. The fuel cell stack is configured to generate electric current using the discharged air and the fuel. The fuel cell stack is positioned to radially direct partially oxidized fuel passing through the fuel cell stack into the combustion chamber of the combustor. The combustor is configured to combust the partially oxidized fuel into one or more gaseous combustion products that drive a downstream turbine.

Optionally, the fuel cell stack circumferentially surrounds the combustion chamber around the annular axis.

Optionally, the fuel cell stack is a solid oxide fuel cell stack.

Optionally, the fuel cell stack includes fuel cells that are stacked next to each other in a direction that is parallel to the annular axis.

Optionally, the fuel cells in the fuel cell stack form concentric rings that at least partially encircle the annular axis.

Optionally, each of the fuel cells includes a cathode, an anode, and an electrolyte between the cathode and the anode in a direction that is parallel to the annular axis.

Optionally, each of the fuel cells also includes at least a portion of a first bipolar plate that is spaced apart from the cathode and at least a portion of a second bipolar plate that is spaced apart from the anode. The cathode can be spaced apart from the first bipolar plate in a direction that is parallel to the annular axis by a cathode flow field through which the discharged air from the compressor radially flows toward the annular axis.

Optionally, the second bipolar plate is spaced apart from the anode in the direction that is parallel to the annular axis by an anode flow field through which the discharged air from the compressor radially flows toward the annular axis.

Optionally, the fuel cell stack includes fuel cells that are tubes that are elongated in radial directions that are perpendicular to the annular axis.

Optionally, the fuel cells in the fuel cell stack are formed by undulating anode plates and undulating cathode plates.

Optionally, the undulating anode plates and the undulating cathode plates contact each other in first locations and are spaced apart from each other in different, second locations. Separation between the anode plates and the cathode plates in the second locations can form the tubes of the fuel cells.

In one embodiment, a method includes compressing inlet air using a compressor of a turbine engine, directing the inlet air that is compressed by the compressor into a fuel cell stack disposed radially outward of a combustion chamber of a combustor that extends along an annular axis in the turbine engine, directing fuel into the fuel cell stack, converting at least some of the inlet air that is compressed and the fuel into electric current using the fuel cell stack, radially directing partially oxidized fuel from the fuel cell stack into the combustion chamber of the combustor toward the annular axis, combusting the partially oxidized fuel into one or more gaseous combustion products in the combustion chamber of the combustor, and driving a turbine of the turbine engine using the one or more gaseous combustion products.

This written description uses examples to disclose the inventive subject matter, including the best mode, and also to enable a person of ordinary skill in the art to practice the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they include structural elements that do not differ from the literal language of the claims, or if they include equivalent structural elements with insubstantial differences from the literal languages of the claims.

What is claimed is:

1. An integrated fuel cell and engine combustor assembly, the assembly comprising:
   an annular engine combustor extending along an annular axis, the annular engine combustor having an interior combustion chamber that is configured to be fluidly coupled with an upstream compressor and a downstream turbine; and
   a fuel cell stack circumferentially extending around the interior combustion chamber of the annular engine combustor, the fuel cell stack including plural fuel cells configured to generate electric current,
   wherein the fuel cell stack is positioned to receive discharged air from the compressor and fuel from a fuel manifold, the fuel cells in the fuel cell stack configured to generate the electric current using the discharged air and at least some of the fuel,
   wherein the fuel cell stack is positioned to radially direct partially oxidized fuel from the fuel cells into the interior combustion chamber of the annular engine combustor,
   wherein the annular engine combustor is configured to combust the partially oxidized fuel into one or more gaseous combustion products that are directed into and drive the downstream turbine.

2. The assembly of claim 1, wherein the fuel cell stack is positioned radially outward of the interior combustion chamber of the annular engine combustor such that the interior combustion chamber is disposed between the annular axis and the fuel cell stack.

3. The assembly of claim 1, wherein the fuel cells in the fuel cell stack are stacked next to each other in a direction that is parallel to the annular axis.

4. The assembly of claim 1, wherein each of the fuel cells includes a cathode, an anode, and an electrolyte between the cathode and the anode in a direction that is parallel to the annular axis.

5. The assembly of claim 1, wherein the fuel cells in the fuel cell stack are elongated tubes that are elongated in radial directions that are perpendicular to the annular axis.

6. The assembly of claim 5, wherein the fuel cells in the fuel cell stack are formed by undulating anode plates and undulating cathode plates.

7. The assembly of claim 1, wherein the fuel cells in the fuel cell stack are conductively connected with each other such that the electric current individually generated by the fuel cells is added together.

8. An engine assembly, the assembly comprising:
   an engine combustor having a combustion chamber with an outer diameter that extends along an annular axis; and
   a fuel cell stack extending around the outer diameter of the combustion chamber and around the annular axis such that the outer diameter of the combustion chamber is between the annular axis and the fuel cell stack along radial directions outwardly extending from the annular axis,
   wherein the fuel cell stack is positioned to receive discharged air from a compressor and fuel, the fuel cell stack configured to generate electric current using the discharged air and the fuel,
   wherein the fuel cell stack is positioned to radially direct partially oxidized fuel passing through the fuel cell stack into the combustion chamber of the combustor,
   wherein the combustor is configured to combust the partially oxidized fuel into one or more gaseous combustion products that drive a downstream turbine,
   wherein each of the fuel cells includes a cathode, an anode, and an electrolyte between the cathode and the anode in a direction that is parallel to the annular axis,
   wherein each of the fuel cells also includes at least a portion of a first bipolar plate that is spaced apart from the cathode and at least a portion of a second bipolar plate that is spaced apart from the anode, wherein the cathode is spaced apart from the first bipolar plate in a direction that is parallel to the annular axis by a cathode flow field through which the discharged air from the compressor radially flows toward the annular axis.

9. The assembly of claim 8, wherein the fuel cell stack circumferentially surrounds the combustion chamber around the annular axis.

10. The assembly of claim 8, wherein the fuel cell stack is a solid oxide fuel cell stack.

11. The assembly of claim 8, wherein the fuel cell stack includes fuel cells that are stacked next to each other in a direction that is parallel to the annular axis.

12. The assembly of claim 8, wherein the second bipolar plate is spaced apart from the anode in the direction that is parallel to the annular axis by an anode flow field through which the discharged air from the compressor radially flows toward the annular axis.

13. The assembly of claim 8, wherein the fuel cell stack includes fuel cells that are tubes that are elongated in radial directions that are perpendicular to the annular axis.

14. The assembly of claim 13, wherein the tubes of the fuel cell stack are adjacent fuel and air passages in a honeycomb arrangement.

15. The assembly of claim 13, wherein the fuel cells in the fuel cell stack are formed by undulating anode plates and undulating cathode plates.

16. The assembly of claim 15, wherein the undulating anode plates and the undulating cathode plates contact each other in first locations and are spaced apart from each other in different, second locations, wherein separation between the anode plates and the cathode plates in the second locations form the tubes of the fuel cells.

* * * * *